US012618121B2

(12) United States Patent
Yamashita et al.

(10) Patent No.: US 12,618,121 B2
(45) Date of Patent: May 5, 2026

(54) ADDITIVE MANUFACTURING WIRE, ADDITIVELY-MANUFACTURED OBJECT, AND ADDITIVE MANUFACTURING METHOD

(71) Applicant: DAIDO STEEL CO., LTD., Nagoya (JP)

(72) Inventors: Masakazu Yamashita, Nagoya (JP); Kazuki Tachi, Nagoya (JP); Mototsugu Osaki, Tokyo (JP)

(73) Assignee: Daido Steel Co., Ltd., Nagoya (JP)

( * ) Notice: Subject to any disclaimer, the term of this patent is extended or adjusted under 35 U.S.C. 154(b) by 82 days.

(21) Appl. No.: 18/091,938

(22) Filed: Dec. 30, 2022

(65) Prior Publication Data

US 2023/0220511 A1 Jul. 13, 2023

(30) Foreign Application Priority Data

| Jan. 11, 2022 | (JP) | ................................. | 2022-002134 |
| Oct. 20, 2022 | (JP) | ................................. | 2022-168584 |

(51) Int. Cl.
| *C21D 9/52* | (2006.01) |
| *B33Y 10/00* | (2015.01) |
(Continued)

(52) U.S. Cl.
CPC .............. *C21D 9/525* (2013.01); *B33Y 10/00* (2014.12); *B33Y 70/00* (2014.12); *C21D 6/004* (2013.01);
(Continued)

(58) Field of Classification Search
None
See application file for complete search history.

(56) References Cited

U.S. PATENT DOCUMENTS

| 2008/0093352 A1 | 4/2008 | Jang et al. |
| 2009/0032246 A1 | 2/2009 | Takabe et al. |
(Continued)

FOREIGN PATENT DOCUMENTS

| CN | 101029374 A | 9/2007 |
| CN | 101541997 A | 9/2009 |
(Continued)

OTHER PUBLICATIONS

Taiwanese Office Action, dated Nov. 3, 2023 in Taiwanese Patent Application No. 112100827 and English Translation thereof.
(Continued)

*Primary Examiner* — Anthony M Liang
(74) *Attorney, Agent, or Firm* — McGinn IP Law Group, PLLC

(57) ABSTRACT

The present invention relates to an additive manufacturing wire, containing, in terms of % by mass, $0\% < Si \leq 2.0\%$, $0\% < Mn \leq 6.0\%$, $3.0\% \leq Ni \leq 15.0\%$, $20.0\% \leq Cr \leq 30.0\%$, $1.0\% \leq Mo \leq 5.0\%$, $0\% < N \leq 0.50\%$, with a balance being Fe and unavoidable impurities, in which $C \leq 0.10\%$ is satisfied, and $27 < A < 67$ is satisfied, when $Cr_{eq}$ is defined as $Cr + Mo + 1.5Si + 0.5(Nb + W) + 2(Ti + Al)$, $Ni_{eq}$ is defined as $Ni + 30C + 20N + 0.5(Mn + Cu + Co)$, and A is defined as $-16.2 + 6.3Cr_{eq} - 9.3Ni_{eq}$, here, in the definition of $Cr_{eq}$ and $Ni_{eq}$, each element symbol indicates a content of the each element in units of % by mass.

9 Claims, 3 Drawing Sheets

(51) Int. Cl.

| | |
|---|---|
| *B33Y 70/00* | (2020.01) |
| *C21D 6/00* | (2006.01) |
| *C22C 38/04* | (2006.01) |
| *C22C 38/06* | (2006.01) |
| *C22C 38/34* | (2006.01) |
| *C22C 38/42* | (2006.01) |
| *C22C 38/44* | (2006.01) |
| *C22C 38/48* | (2006.01) |
| *C22C 38/50* | (2006.01) |
| *C22C 38/52* | (2006.01) |
| *C22C 38/58* | (2006.01) |
| *B23K 9/04* | (2006.01) |
| *B23K 26/342* | (2014.01) |

(52) U.S. Cl.
CPC ............. *C21D 6/005* (2013.01); *C21D 6/007* (2013.01); *C21D 6/008* (2013.01); *C22C 38/04* (2013.01); *C22C 38/06* (2013.01); *C22C 38/34* (2013.01); *C22C 38/42* (2013.01); *C22C 38/44* (2013.01); *C22C 38/48* (2013.01); *C22C 38/50* (2013.01); *C22C 38/52* (2013.01); *C22C 38/58* (2013.01); *B23K 9/04* (2013.01); *B23K 26/342* (2015.10); *C21D 2211/001* (2013.01); *C21D 2211/005* (2013.01)

(56) References Cited

U.S. PATENT DOCUMENTS

| | | | |
|---|---|---|---|
| 2019/0099822 A1 | 4/2019 | Zhang et al. |
| 2019/0099844 A1 | 4/2019 | Zhang et al. |
| 2020/0398339 A1 | 12/2020 | Ibuki et al. |
| 2022/0331868 A1 | 10/2022 | Usuda et al. |

FOREIGN PATENT DOCUMENTS

| | | | |
|---|---|---|---|
| CN | 102605288 A | 7/2012 |
| CN | 108220813 A | 6/2018 |
| CN | 112095045 A | 12/2020 |
| JP | H07-197130 A | 8/1995 |
| JP | H08155663 A | 6/1996 |
| JP | 2020-147785 A | 9/2020 |
| JP | 2020-164882 A | 10/2020 |
| KR | 10-0774155 B1 | 11/2007 |
| KR | 10-2019-0038412 A | 4/2019 |
| KR | 20200067694 A | 6/2020 |
| TW | 202124070 A | 7/2021 |

OTHER PUBLICATIONS

Korean Office Action, dated Oct. 15, 2024 in Korean Application No. 10-2023-0001492 and English Translation thereof.

Extended European Search Report EP-EESR 23150965.4 issued on May 26, 2023.

Zhang Yiqi et al: "The microstructure and mechanical properties of . . . via flux-cored wire arc-additive manufacturing", Journal of Manufacturing Processes, Society of Manufacturing Engineers, Dearborn, MI, US, vol. 69, Jul. 31, 2021, pp. 204-214.

A Hosseini Vahid et al: "Wire-arc additive manufacturing of a duplex stainless steel: thermal cycle analysis and microstructure characterization", Welding in the world, vol. 63, No. 4, Jun. 1, 2019, pp. 975-987.

Australian Office Action, dated Oct. 31, 2023 in Australian Patent Application No. 2023200059 (In English).

"Basic Principles of Welding Metallurgy" , Edited by Zeyu DU, China Machine Press pp. 107 , Jun. 2018.

Chinese Office Action, dated Jan. 27, 2025 in Chinese Application No. 202310038557.3 and English Translation Thereof.

Chinese Office Action dated Jun. 12, 2025 in Chinese Patent Application No. 202310038557.3 with English machine translation.

Jishu, Common Knowledge Evidence Basic Techniques for Electroplating Workers, pp. 1-3 with English machine translation.

Chinese Office Action dated Sep. 23, 2025 in Chinese Patent Application No. 202310038557.3 with English translation.

ADDITIVE MANUFACTURING WIRE, ADDITIVELY-MANUFACTURED OBJECT, AND ADDITIVE MANUFACTURING METHOD

CROSS-REFERENCE TO RELATED APPLICATIONS

This application is based on and claims priority under 35 USC 119 from Japanese Patent Application No. 2022-002134 filed on Jan. 11, 2022 and Japanese Patent Application No. 2022-168584 filed on Oct. 20, 2022, the contents of which are incorporated herein by reference.

TECHNICAL FIELD

The present invention relates to an additive manufacturing wire, an additively-manufactured object, and an additive manufacturing method, and more particularly to an additive manufacturing wire used for additive manufacturing of metal, an additively-manufactured object manufactured by using the additive manufacturing wire, and an additive manufacturing method using the additive manufacturing wire.

BACKGROUND ART

As a new technique for manufacturing a three-dimensional structure, an additive manufacturing technique has recently been remarkably developed. Typical examples of the additive manufacturing technique using a metal material include a technique using a metal powder and a technique using a metal wire. In the additive manufacturing using a metal wire, a desired shape is formed by three-dimensionally laminating layers formed by melting the metal wire with an arc or laser beam and solidifying the melt.

As a metal wire for additive manufacturing, a metal wire made of a stainless steel is often used. A component composition of the wire made of a stainless steel for additive manufacturing is being studied from the viewpoint of obtaining desired properties such as mechanical strength in the obtained additively-manufactured object. For example, Patent Literature 1 below discloses a metal wire for welding additive manufacturing that can stably obtain a substantially austenite single phase during welding. In addition, Patent Literature 2 discloses a metal wire for welding additive manufacturing, whose composition is adjusted such that a martensite structure always appears.

Patent Literature 1: JP2020-164882A
Patent Literature 2: JP2020-147785A

SUMMARY OF INVENTION

When additive manufacturing is performed by using a metal wire made of a stainless steel, properties of the obtained additively-manufactured object are highly dependent on a state of a metal structure in the additively-manufactured object. Therefore, in the additively-manufactured object, it is important to control the metal structure from the viewpoint of obtaining desired properties. A component composition of the metal wire is set from the viewpoint of obtaining an austenite single phase in Patent Literature 1 and from the viewpoint of obtaining a martensite structure in Patent Literature 2. In addition, it is also being studied to use a wire made of a duplex stainless steel for additive manufacturing such that properties of the duplex stainless steel such as pitting corrosion resistance and high strength are exhibited in the additively-manufactured object.

However, even in the case where a duplex stainless steel is used as a metal wire that is a raw material for additive manufacturing, in an additive manufacturing process, a phase ratio between an austenite phase and a ferrite phase is changed under the influence of thermal history such as heating and cooling, making it difficult to obtain a desired metal structure and properties. In particular, additive manufacturing tends to result in excessive austenite structures, and pitting corrosion resistance of the additively-manufactured object tends to be lowered. Although the phase ratio between the austenite phase and the ferrite phase can be adjusted by heating the obtained additively-manufactured object, normally, adjustment of the phase ratio requires a heat treatment at 1,350° C. or higher, which is poor in industrial practicality.

A problem to be solved by the present invention is to provide an additive manufacturing wire that can provide an additively-manufactured object made of a duplex stainless steel containing an austenite phase and a ferrite phase in a well-balanced manner when additive manufacturing is performed, an additively-manufactured object manufactured by using such an additive manufacturing wire, and an additive manufacturing method using such an additive manufacturing wire.

[1] In order to solve the above problem, an additive manufacturing wire according to the present disclosure contains, in terms of % by mass, 0%<Si≤2.0%, 0%<Mn≤6.0%, 3.0%≤Ni≤15.0%, 20.0%≤Cr≤30.0%, 1.0%≤Mo≤5.0%, 0%<N≤0.50%, with a balance being Fe and unavoidable impurities, in which C≤0.10% is satisfied, and 27<A<67 is satisfied, when $Cr_{eq}$ is defined as Cr+Mo+1.5Si+0.5(Nb+W)+2(Ti+Al), $Ni_{eq}$ is defined as Ni+30C+20N+0.5(Mn+Cu+Co), and A is defined as $-16.2+6.3Cr_{eq}-9.3Ni_{eq}$, here, in the definition of $Cr_{eq}$ and $Ni_{eq}$, each element symbol indicates a content of the each element in units of % by mass.

[2] In the above aspect of [1], it is preferable that the additive manufacturing wire further contains, in terms of % by mass, at least one selected from the group consisting of 0.01%≤Cu≤6.0%, 0%<Co≤5.0%, 0%<W≤5.0%, 0%<Al≤0.30%, 0%<Ti≤0.50%, 0%<Nb≤4.0%, and 0%<Mg≤0.0050%.

[3] In the above aspect of [1] or [2], it is preferable that when an additively-manufactured object is manufactured in a condition that a slowest cooling rate in a temperature range between 1,200° C. and 800° C. is 10° C./s or more and 140° C./s or less, the additively-manufactured object has a ferrite content of 30% by volume or more and 70% by volume or less.

[4] In any one aspect of [1] to [3] above, it is preferable that a relationship of CPT/PREN≥0.7 is satisfied, when PREN that is a pitting resistance equivalent number is calculated as PREN=Cr+3.3(Mo+0.5W)+16N, and CPT is defined as a critical pitting temperature of an additively-manufactured object that is manufactured in a condition that a slowest cooling rate in a temperature range between 1,200° C. and 800° C. is 10° C./s or more and 140° C./s or less, here in the definitional equation of PREN, each element symbol indicates a content of the each element in units of % by mass.

[5] In any one aspect of [1] to [4] above, it is preferable that the additive manufacturing wire is a solid wire or a metal-cored wire.

[6] In any one aspect of [1] to [5] above, it is preferable that the additive manufacturing wire has a coating layer made of Cu or a Cu alloy on an outer periphery thereof.

[7] An additively-manufactured object according to the present disclosure is obtained by using the additive manufacturing wire described in any one aspect of [1] to [6] above.

[8] In the above aspect of [7], it is preferable that the additively-manufactured object has a ferrite content of 30% by volume or more and 70% by volume or less.

[9] An additive manufacturing method according to the present disclosure, contains a step of performing an additive manufacturing using the additive manufacturing wire described in any one aspect of [1] to [6] above.

[10] In the above aspect of [9], it is preferable that the additive manufacturing is performed in a condition that a slowest cooling rate in a temperature range between 1,200° C. and 800° C. is 10° C./s or more and 140° C./s or less.

[11] In the above aspect of [9] or [10], it is preferable that the additive manufacturing method further contains a step of performing a beat treatment on an additively-manufactured object at a temperature of 800° C. or higher and 1,200° C. or lower.

The additive manufacturing wire according to the present disclosure having the above configuration of [1] has the above component composition, so that when the additive manufacturing is performed, an additively-manufactured object made of a duplex stainless steel containing an austenite phase and a ferrite phase in a well-balanced manner can be obtained. In particular, a duplex stainless steel containing about 30% to 70% by volume of the ferrite phase can be obtained, and excessive contents of the austenite phase and the ferrite phase can be avoided, and thus high pitting corrosion resistance can be achieved.

In the above aspect of [2], the additive manufacturing wire further contains, in terms of % by mass, at least one element selected from Cu, Co, W, Al, Ti, Nb, and Mg in the above respective contents. In the case where at least one element of Cu and Co is contained, the austenite phase is stably generated, which is highly effective in improving strength of the additively-manufactured object. In addition, in the case where at least one element selected from W, Al, Ti, and Nb is contained, the ferrite phase is stably generated, which is highly effective in improving the strength and pitting corrosion resistance of the additively-manufactured object and in refining of the structure. Mg is also effective in refining of the structure.

In the above aspect of [3], in the additively-manufactured object manufactured in a condition that the slowest cooling rate in the temperature range between 1,200° C. and 800° C. is 10° C./s or more and 140° C./s or less, the ferrite content is 30% by volume or more and 70% by volume or less, so that in the additively-manufactured object, a structure of a duplex stainless steel containing an austenite phase and a ferrite phase in a well-balanced manner can be obtained. In general, when an additive manufacturing is performed, since a next layer is laminated on a previously formed layer, each layer is difficult to be cooled and a cooling rate is slowed, which tend to easily generate the austenite phase. On the other hand, the use of the additive manufacturing wire of the present disclosure can prevent excessive generation of the austenite phase, even when the cooling rate is slow.

In the above aspect of [4], since the pitting resistance equivalent number PREN and the critical pitting temperature CPT satisfy the relationship of CPT/PREN≥0.7, the pitting corrosion resistance predicted based on the alloy composition of the additive manufacturing wire closely corresponds to the actual pitting corrosion resistance. The additive manufacturing wire according to the present disclosure has the above composition, and contains an austenite phase and a ferrite phase in a well-balanced manner, and thus has a suitable structure that well reflects the pitting corrosion resistance predicted based on the alloy composition.

In the above aspect of [5], since the additive manufacturing wire is a solid wire or a metal-cored wire, the additive manufacturing wire can be suitably used for actual additive manufacturing.

In the above aspect of [6], when a coating layer made of Cu or a Cu alloy is provided on the outer periphery of the additive manufacturing wire, the coating layer serves to improve a feedability of the additive manufacturing wire, and the additive manufacturing wire can be fed smoothly. In addition, when the wire is fed, wear of a constituent member of an additive manufacturing device, such as a welding tip at a tip of a welding torch, is reduced.

The additively-manufactured object according to the present disclosure having the above configuration of [7] is manufactured by using the above additive manufacturing wire, and thus has a structure of a duplex stainless steel containing an austenite phase and a ferrite phase in a well-balanced manner. As a result, the additively-manufactured object exhibits characteristic properties of the duplex stainless steel, such as high pitting corrosion resistance.

In the above aspect of [8], in the additively-manufactured object, the ferrite content is 30% by volume or more and 70% by volume or less, so that a structure of a duplex stainless steel containing an austenite phase and a ferrite phase in a well-balanced manner can be obtained. Specifically, it is possible to avoid a decrease in pitting corrosion resistance due to an excessive content of the austenite phase.

In the additive manufacturing method according to the present disclosure having the above configuration of [9], since the additive manufacturing is performed by using the above additive manufacturing wire, influence of the thermal history during additive manufacturing on the phase ratio can be reduced, and an additively-manufactured object made of a duplex stainless steel containing an austenite phase and a ferrite phase in a well-balanced manner can be obtained.

In the above aspect of [10], the additive manufacturing is performed in a condition that the slowest cooling rate in the temperature range between 1,200° C. and 800° C. is 10° C./s or more and 140° C./s or less, so that an additively-manufactured object containing an austenite phase in an amount of 30% to 70% by volume and having high pitting corrosion resistance can be suitably manufactured.

In the above aspect of [11], the heat treatment is performed on the manufactured additively-manufactured object at the temperature of 800° C. or higher and 1,200° C. or lower, so that the phase ratio between the austenite phase and the ferrite phase in the additively-manufactured object can be adjusted by the heat treatment. In the related art, a heat treatment for adjusting a phase ratio of a duplex stainless steel is performed at a high temperature of 1,350° C. or higher, whereas the heat treatment of this aspect is performed at a temperature lower than the high temperature. Since the heat treatment temperature is low, it is possible to prevent deformation of the additively-manufactured object due to thermal stress generated during the heat treatment. In the additively-manufactured object obtained by using the additive manufacturing wire of the present disclosure, since a transformation temperature between the austenite phase and the ferrite phase is low, the phase ratio can be adjusted to a phase ratio of 1:1 or a phase ratio close thereto by a heat treatment at 800° C. or higher and 1,200° C. or lower.

DESCRIPTION OF EMBODIMENTS

Figure 1:
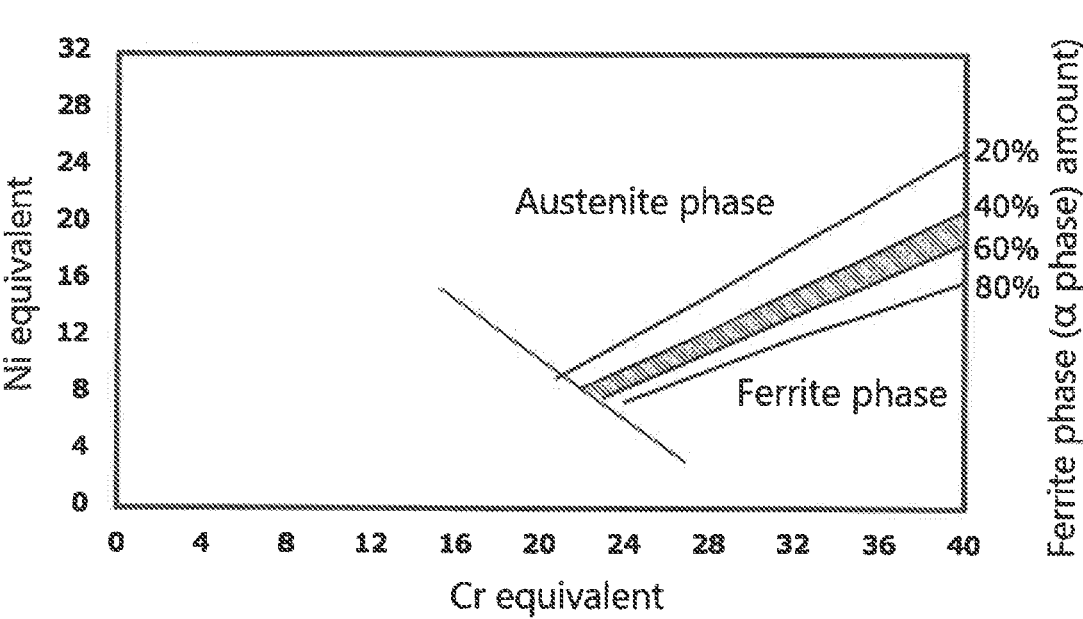
FIG. 1 is a schematic structure prediction diagram of a duplex stainless steel.

Hereinafter, an additive manufacturing wire, an additively-manufactured object, and an additive manufacturing method according to embodiments of the present invention will be described in detail. In the present specification, a unit indicating a component composition of an alloy is % by mass. In addition, a unit indicating the amount of a metal phase present is % by volume. Regarding the component composition of the alloy, in a formula showing a relationship of contents of elements, each element symbol indicates a content of the each element in units of % by mass.

[Additive Manufacturing Wire]

First, an additive manufacturing wire (hereinafter sometimes referred to as a metal wire) according to an embodiment of the present invention will be described. The additive manufacturing wire according to an embodiment of the present invention is used as a raw material for additive manufacturing, and has a component composition described below, so that an additively-manufactured object to be manufactured is made of a duplex stainless steel (SUS) containing an austenite phase (γ phase) and a ferrite phase (a phase).

(Component Composition)

The additive manufacturing wire according to an embodiment of the present invention contains the following elements and the balance being Fe and unavoidable impurities. Types, component ratios, reasons for limitation, and the like of additive elements are as follows.

0%<Si≤2.0%

In an additively-manufactured object manufactured by using the metal wire, Si causes a ferrite phase to be stably generated and is effective in improving strength and pitting corrosion resistance of the additively-manufactured object. Since even a small amount of Si can exhibit the above effect, there is no particular lower limit for the content thereof, and it is sufficient if 0%<Si. From the viewpoint of further improving the above effect, it is more preferable that 0.30%≤Si, and further preferably 0.40%≤Si.

On the other hand, in the case where a large amount of Si is contained, the ferrite phase is excessive in the additively-manufactured object, and it is difficult to obtain properties as a duplex SUS on the contrary. In addition, an oxidizing slag is excessively generated, and a shape of the additively-manufactured object is deteriorated. Therefore, from the viewpoint of keeping the ferrite content within an appropriate range and maintaining formability, Si≤2.0%. More preferably, Si≤1.5%.

0%<Mn≤6.0%

In the additively-manufactured object manufactured by using the metal wire, Mn causes an austenite phase to be stably generated and is effective in improving the strength of the additively-manufactured object. Since even a small amount of Mn can exhibit the above effect, there is no particular lower limit for the content thereof, and it is sufficient if 0%<Mn. From the viewpoint of further improving the above effect, it is more preferable that 0.30%≤Mn, and further preferably 0.60%≤Mn.

On the other hand, in the case where a large amount of Mn is contained, the austenite phase is excessive in the additively-manufactured object. In addition, in the case where Mn is excessively added, a slag is generated and a formability is deteriorated. Therefore, from the viewpoint of keeping the austenite content within an appropriate range, achieving both high strength and high pitting corrosion resistance in the additively-manufactured object, and maintaining the formability, Mn≤6.0%. More preferably, Mn≤2.0%.

3.0%≤Ni≤15.0%

In the additively-manufactured object manufactured by using the metal wire, Ni also causes the austenite phase to be stably generated and is effective in improving the strength of the additively-manufactured object. From the viewpoint of sufficiently achieving the effect, the content of Ni is set to 3.0%≤Ni. From the viewpoint of further improving the effect, it is more preferable that 4.0%≤Ni.

On the other hand, in the case where a large amount of Ni is contained, the austenite phase is excessive in the additively-manufactured object. Therefore, from the viewpoint of keeping the austenite content within an appropriate range, and achieving both high strength and high pitting corrosion resistance in the additively-manufactured object, Ni≤15.0%. More preferably, Ni≤10.0%.

20.0%≤Cr≤30.0%

In the additively-manufactured object manufactured by using the metal wire, Cr causes the ferrite phase to be stably generated and is effective in improving the strength and the pitting corrosion resistance of the additively-manufactured object. From the viewpoint of sufficiently achieving the effect, the content of Cr is set to 20.0%≤Cr. From the viewpoint of further improving the effect, it is more preferable that 23.0%≤Cr.

On the other hand, in the case where a large amount of Cr is contained, the ferrite phase is excessive in the additively-manufactured object, and it is difficult to obtain properties as a duplex SUS on the contrary. Therefore, from the viewpoint of keeping the ferrite content within an appropriate range, Cr≤30.0%. More preferably, Cr≤27.0%.

1.0%≤Mo≤5.0%

In the additively-manufactured object manufactured by using the metal wire, Mo also causes the ferrite phase to be stably generated and is effective in improving the strength and the pitting corrosion resistance of the additively-manufactured object. From the viewpoint of sufficiently achieving the effect, the content of Mo is set to 1.0%≤Mo. From the viewpoint of further improving the effect, it is more preferable that 2.0%≤Mo.

On the other hand, in the case where a large amount of Mo is contained, the ferrite phase is excessive in the additively-manufactured object, and it is difficult to obtain properties as a duplex SUS on the contrary. Therefore, from the viewpoint of keeping the ferrite content within an appropriate range, Mo≤5.0%. More preferably, Mo≤4.0%.

0%<N≤0.50%

In the additively-manufactured object manufactured by using the metal wire, N causes the austenite phase to be stably generated and is effective in improving the strength of the additively-manufactured object. Since even a small amount of N can exhibit the above effect, there is no particular lower limit for the content thereof, and it is sufficient if 0%<N. From the viewpoint of further improving the above effect, it is more preferable that 0.10%≤N, and further preferably 0.15%≤N.

On the other hand, in the case where a large amount of N is contained, the austenite phase is excessive in the additively-manufactured object. In addition, excessive addition of N causes a blowhole in the additively-manufactured object. Therefore, from the viewpoint of keeping the austenite content within an appropriate range, achieving both high strength and high pitting corrosion resistance in the additively-manufactured object, and preventing formation of the blowhole, N≤0.50%. More preferably, N≤0.40%.

The metal wire according to the present embodiment contains the above predetermined contents of Si, Mn, Ni, Cr, Mo, and N, and the balance being Fe and unavoidable impurities. Here, the content of C that may be contained as an unavoidable impurity is limited to the following content.

C≤0.10%

In the additively-manufactured object manufactured by using the metal wire, even in a small amount, C promotes the generation of the austenite phase. Therefore, from the viewpoint of avoiding excessive generation of austenite, the content of C is restrained to C≤0.10%. More preferably, C≤0.05%.

Further, in the metal wire according to the present embodiment, it is preferable that the contents of P, S, and O that may be contained as the unavoidable impurities are respectively limited to the following ranges.

P≤0.050%, and S≤0.050% P and S can be inevitably mixed in the metal wire due to a raw material and the like, but in the case where the contents of both P and S are 0.050% or less, P and S do not significantly affect a state of the metal structure in the additive manufacturing wire to be manufactured.

O≤0.20%

O can also be inevitably mixed in the metal wire due to a raw material and the like. In the case where O is contained, the metal structure is likely to be refined, leading to an improvement in strength, but a slag may be formed and the pitting corrosion resistance of the additively-manufactured object may be deteriorated. Therefore, in the case where the content of 0 is restrained to 0.20% or less, in the additively-manufactured object to be manufactured, slag formation can be limited and a deposited shape can be easily maintained.

In addition to C, P, S, and O, a rare earth element, Sn, Bi, B, Zr, H, Ca, and the like are assumed as the unavoidable impurities that may be contained in the metal wire. It is preferable that the total content of these elements including the rare earth element, Sn, Bi, B, Zr, H, and Ca, is restrained to 0.01% or less.

The metal wire according to the present embodiment may optionally contain one or two or more elements selected from the following elements in addition to the above-described essential elements. In the case where the metal wire contains at least one element of Cu and Co among respective predetermined contents of additive elements listed below, the austenite phase is stably generated, which is highly effective in improving the strength of the additively-manufactured object. In addition, in the case where the metal wire contains at least one element selected from W, Al, Ti, and Nb, the ferrite phase is stably generated, which is highly effective in improving the strength and pitting corrosion resistance of the additively-manufactured object and in refining of the structure. Even in the case where the metal wire contains Mg, the effect of refining of the structure can be achieved.

0.01%≤Cu≤6.0%

In the additively-manufactured object manufactured by using the metal wire, Cu causes the austenite phase to be stably generated and is effective in improving the strength of the additively-manufactured object. Since even a small amount of Cu can exhibit the above effect, it is sufficient if 0.01%≤Cu in the case where Cu is contained. From the viewpoint of further improving the above effect, it is more preferable that 0.03%≤Cu. It should be noted that even in the case where the metal wire does not contain Cu at a concentration of 0.01% or more, the metal wire may contain less than 0.01% of Cu as an unavoidable impurity.

On the other hand, in the case where a large amount of Cu is contained, the austenite phase is excessive in the additively-manufactured object. Therefore, from the viewpoint of keeping the austenite content within an appropriate range, and achieving both high strength and high pitting corrosion resistance in the additively-manufactured object, Cu≤6.0%. More preferably, Cu≤2.0%.

0%<Co≤5.0%

In the additively-manufactured object manufactured by using the metal wire, Co causes the austenite phase to be stably generated and is effective in improving the strength of the additively-manufactured object. Since even a small amount of Co can exhibit the above effect, there is no particular lower limit for the content thereof, and it is sufficient if 0%<Co in the case where Co is contained. From the viewpoint of further improving the above effect, it is more preferable that 0.30%≤Co.

On the other hand, in the case where a large amount of Co is contained, the austenite phase is excessive in the additively-manufactured object. From the viewpoint of keeping the austenite content within an appropriate range, and achieving both high strength and high pitting corrosion resistance in the additively-manufactured object, Co≤5.0%. More preferably, Co≤1.0%.

0%<W≤5.0%

In the additively-manufactured object manufactured by using the metal wire, W causes the ferrite phase to be stably generated and is effective in improving the strength and the pitting corrosion resistance of the additively-manufactured object. Since even a small amount of W can exhibit the above effect, there is no particular lower limit for the content thereof, and it is sufficient if 0%<W in the case where W is contained. From the viewpoint of further improving the above effect, it is more preferable that 0.10%≤W.

On the other hand, in the case where a large amount of W is contained, the ferrite phase is excessive in the additively-manufactured object, and it is difficult to obtain properties as a duplex SUS on the contrary. In addition, workability is deteriorated. Therefore, from the viewpoint of keeping the ferrite content within an appropriate range and maintaining the workability, W≤5.0%. More preferably, W≤4.0%.

0%<Al≤0.30%, and 0%<Ti≤0.50% In the additively-manufactured object manufactured by using the metal wire, Al and Ti also cause the ferrite phase to be stably generated and are effective in improving the strength and the pitting corrosion resistance of the additively-manufactured object. In addition, Al and Ti have an effect of refining the metal structure in the additively-manufactured object. Refining the metal structure is effective in improving the strength of the additively-manufactured object. Since even a small amount of Al and Ti can exhibit those effects, there are no particular lower limits for the contents thereof, and it is sufficient if 0%<Al and 0%<Ti in the case where Al and/or Ti is contained. From the viewpoint of further improving the above effects, it is more preferable that 0.02%≤Al and that 0.02%≤Ti.

On the other hand, in the case where large amounts of Al and Ti are contained, the ferrite phase is excessive in the additively-manufactured object, and it is difficult to obtain properties as a duplex SUS on the contrary. The effect of refining the structure is also saturated. From the viewpoint of avoiding these phenomena and deterioration of the formability due to slag formation, Al≤0.30% and Ti≤0.50%. Regarding Al, more preferably, Al≤0.20%.

0%<Nb≤4.0%

In the additively-manufactured object manufactured by using the metal wire, Nb has an effect of refining the metal structure. Since even a small amount of Nb can exhibit the effect, there is no particular lower limit for the content thereof, and it is sufficient if 0%<Nb in the case where Nb is contained. From the viewpoint of further improving the effect, it is more preferable that 0.10%≤Nb.

On the other hand, from the viewpoint of avoiding saturation of the effect of refining the metal structure by Nb, and from the viewpoint of avoiding deterioration of the strength and deterioration of corrosion resistance due to formation of a Laves phase, Nb≤4.0%. More preferably, Nb≤0.60%, further Nb≤0.50%.

0%<Mg≤0.0050%

In the additively-manufactured object manufactured by using the metal wire, Mg has an effect of refining the metal structure. Since even a small amount of Mg can exhibit the effect, there is no particular lower limit for the content thereof, and it is sufficient if 0%<Mg. From the viewpoint of further improving the effect, it is more preferable that 0.0010%≤Mg in the case where Mg is contained. On the other hand, from the viewpoint of avoiding saturation of the effect of refining the metal structure, Mg≤0.0050%. More preferably, Mg≤0.0040%.

The metal wire according to the present embodiment not only contains the above essential elements and optional elements in the above predetermined contents, but also satisfies the following relationships between the contents of the elements. Here, Cr equivalent ($Cr_{eq}$), Ni equivalent ($Ni_{eq}$), and an A value indicating a balance of the Cr equivalent and the Ni equivalent are defined as follows.

$$Cr_{eq}=Cr+Mo+1.5Si+0.5(Nb+W)+2(Ti+Al) \quad (1)$$

$$Ni_{eq}=Ni+30C+20N+0.5(Mn+Cu+Co) \quad (2)$$

$$A=-16.2+6.3Cr_{eq}-9.3Ni_{eq} \quad (3)$$

In the metal wire according to the present embodiment, the A value is in a range of 27<A<67.

The elements contained in the above definitional equation of the Cr equivalent ($Cr_{eq}$) are elements that cause the ferrite phase to be stably generated, and as the contents of these elements are increased and a value of the Cr equivalent is increased, a ratio of the ferrite phase in the obtained SUS structure tends to be increased. On the other hand, the elements contained in the above definitional equation of the Ni equivalent ($Ni_{eq}$) are elements that cause the austenite phase to be stably generated, and as the contents of these elements are increased and a value of the Ni equivalent is increased, a ratio of the austenite phase in the SUS structure tends to be increased. Since the A value includes the Cr equivalent with a positive contribution and the Ni equivalent with a negative contribution, the smaller the A value, the higher the ratio of the austenite phase in the SUS structure, and the larger the A value, the higher the ratio of the ferrite phase in the SUS structure. It should be noted that the respective values of the respective coefficients by which $Cr_{eq}$ and $Ni_{eq}$ are multiplied in the A value are obtained by regression analysis based on examples. It should be noted that the above definitional equations of $Cr_{eq}$ and $Ni_{eq}$ include not only the essential elements but also the optional elements, but in the case where the optional elements are not contained, the content of those elements may be set to zero in the equations.

In the metal wire according to the present embodiment, the A value satisfies 27<A<67, so that the structure of the additively-manufactured object to be manufactured is a duplex SUS containing a ferrite phase and an austenite phase in a well-balanced manner. That is, in the case where 27<A, the ferrite phase is sufficiently generated and high pitting corrosion resistance can be obtained. In addition, when the phase ratio is adjusted by subjecting the manufactured additively-manufactured object to a post-heat treatment, a ratio of the ferrite phase can easily be increased even without employing a high heat treatment temperature. From the viewpoint of improving the effect, it is more preferable that 30<A, further preferably 31≤A, and still preferably 35≤A. A. On the other hand, in the case where A<67, the austenite phase is sufficiently generated, and high mechanical strength such as high hardness can be obtained. From the viewpoint of improving the effect, it is more preferable that A≤65, further preferably A≤55, and still preferably A≤50.

FIG. 1 shows a structure prediction diagram of the duplex SUS. Here, a relationship between the Cr equivalent and the Ni equivalent that determine a predetermined ferrite content (a phase content, a volume ratio of the ferrite phase in the metal structure) is indicated by a straight line. FIG. 1 corresponds, within an approximation range, to a relationship between the ferrite phase content and the Cr equivalent and the Ni equivalent confirmed in Examples shown later.

As shown in FIG. 1, the Ni equivalent and Cr equivalent that determine the predetermined ferrite content are in a linear relationship, and the ferrite content is increased as the Cr equivalent is increased, while the ferrite content is decreased as the Ni equivalent is increased. When an upper limit and a lower limit of the range of the ferrite content to be achieved are determined in the structure prediction diagram, if a component composition is set so as to satisfy the Cr equivalent and the Ni equivalent located between a straight line corresponding to the upper limit and a straight line corresponding to the lower limit, a ferrite content between the lower limit and the upper limit can be obtained in the structure of the duplex SUS. For example, when a ferrite content of 40% or more and 60% or less, at which the phase ratio of the ferrite phase and the austenite phase is close to 1:1, is desired, the Cr equivalent and the Ni equivalent can be set so as to fall within a shaded region in FIG. 1.

As described above, the metal wire according to the present embodiment has a composition that satisfies $27<A<67$, so that when the additive manufacturing is performed and a heat treatment is performed as necessary, a duplex SUS having a ferrite content in a range of 30% or more and 70% or less, and further preferably in a range of 40% or more and 60% or less can be easily obtained. Furthermore, when a condition of the heat treatment is appropriately selected, the phase ratio (volume ratio) between the austenite phase and the ferrite phase can be set to 1:1 or very close thereto. In the case where the phase ratio is 1:1, a balance between the strength and the pitting corrosion resistance of the additively-manufactured object is the best.

The metal wire according to the present embodiment is not particularly limited to a specific type as long as the metal wire has the predetermined component composition described above, and may be formed as a wire material according to a specific application to which the metal wire is applied. For example, it is preferable that the metal wire is formed as a solid wire or a metal-cored wire. The solid wire is a wire material entirely made of a metal material. The metal-cored wire is a wire in which a space surrounded by a metal casing is filled with a metal powder.

The metal wire according to the present embodiment, particularly the solid wire, may have a layer made of Cu or a Cu alloy on an outer periphery thereof as a coating layer provided on a surface thereof. In particular, it is preferable that the coating layer is made of Cu. The coating layer made of Cu or a Cu alloy (hereinafter sometimes simply referred to as a Cu coating layer) serves to improve a feedability of the metal wire. As a result, it is possible to prevent the metal wire from being caught by constituent members of the additive manufacturing device, such as a welding tip at a tip of a torch 2 (see FIG. 2) to hinder smooth feeding of the metal wire, and reduce wear of these constituent members due to contact with the metal wire. Although the Cu coating layer may be directly formed on the surface of the metal wire, it is preferable to form a base layer made of Ni or a Ni alloy on the surface of the metal wire and then form the Cu coating layer on a surface of the base layer. The base layer improves adhesion of the Cu coating layer to the metal wire, and stabilizes the Cu coating layer. The base layer and the Cu coating layer can be suitably formed by being plated onto the surface of the metal wire. In the case where the metal wire is a solid wire, the adhesion of the Cu coating layer can be further improved by drawing the solid wire after these layers are formed.

Although the thickness of the Cu coating layer is not particularly limited, it is preferable that the thickness is 0.1 μm or more from the viewpoint of sufficiently exerting the effect of improving the feedability. On the other hand, it is preferable that the thickness of the Cu coating layer is 3.0 μm or less from the viewpoint of avoiding saturation of the effect due to the formation of the Cu coating layer and restricting an influence on the component composition of the metal wire. Although the thickness of the base layer is not particularly limited, it is preferable that the thickness is 0.1 μm or more from the viewpoint of sufficiently exerting the effect of improving the adhesion of the Cu coating layer. On the other hand, it is preferable that the thickness of the base layer is 2.0 μm or less from the viewpoint of restricting the influence on the component composition of the metal wire. It should be noted that a range of 0.4 mm or more and 5.0 mm or less can be exemplified as a diameter of a metal wire suitable for forming the Cu coating layer (and the base layer) with the respective thicknesses.

Even in the case where the entire metal wire according to the present embodiment is not made of a uniform material, such as the case where the metal wire is a metal-cored wire, or the case where a coating layer (and a base layer) is formed on the surface of the metal wire, the metal wire has the predetermined component composition described above as the entire wire, that is, as the entire metal-cored wire obtained by combining a casing and a metal powder, and as the entire wire including a coating layer (and a base layer). It is preferable that the metal wire does not contain flux.

(Properties of Additively-Manufactured Object to be Manufactured)

Figure 2:
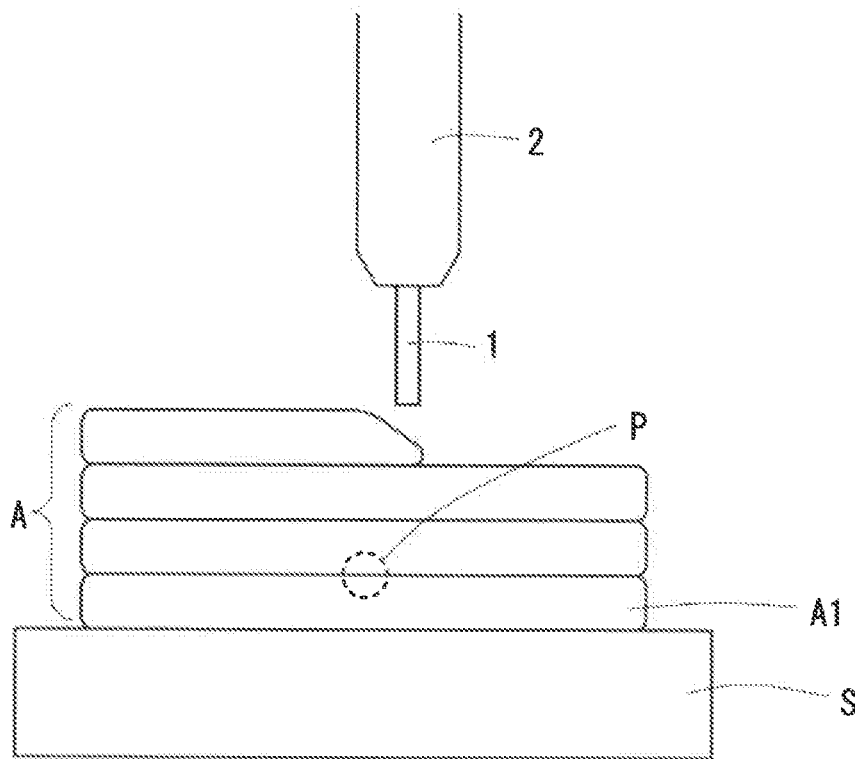
FIG. 2 is a schematic diagram illustrating additive manufacturing using a metal wire.

Here, a process of additive manufacturing using a metal wire 1 will be described with reference to FIG. 2. When the additive manufacturing is performed, the metal wire 1 is melted by heating the metal wire 1 held by the torch 2 with a heat source such as an arc or laser beam. The molten metal material hangs down at a predetermined position on a surface of a base material S. The molten metal is solidified (welded) on the base material S. A layer A1 in which the metal material forming the metal wire 1 is welded on the surface of the base material S in a predetermined pattern is formed by moving the metal wire 1 relative to the base material S. In order to form a three-dimensional additively-manufactured object A, a next layer A1 is formed on the layer A1 formed on the surface of the base material S again by melting and solidifying the metal wire 1. Thus, a plurality of layers A1 are repeatedly formed and three-dimensionally laminated so as to take a desired three-dimensional shape.

Figure 3:
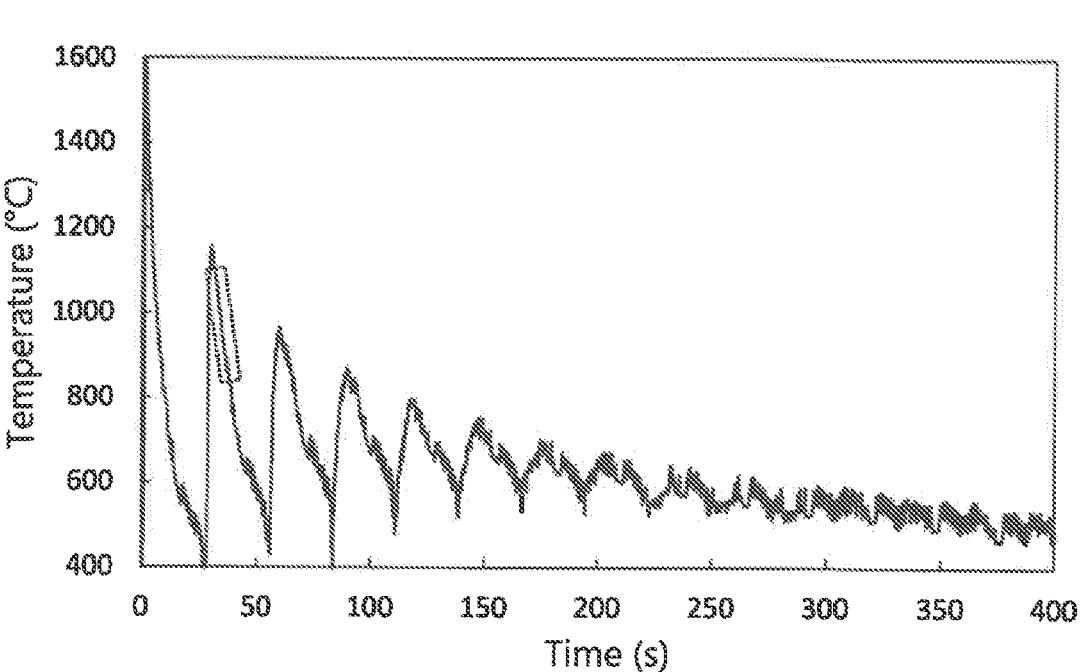
FIG. 3 is a diagram showing an example of a temporal change in a temperature of an additively-manufactured object during the additive manufacturing.

Here, attention is paid to a change in temperature at a lower layer position P, which is a position on the layer A1, which is the lowermost layer. FIG. 3 shows an example of an actual measurement result of the change in temperature at the lower layer position P while the additive manufacturing is performed by laminating a plurality of layers A1 as shown in FIG. 2. In FIG. 3, in a time domain up to at least about 150 seconds, a cycle in which the temperature rises sharply and then falls gradually is repeated. In each cycle, the rapid rise in temperature corresponds to a process in which the metal wire 1 is melted and hot molten metal is newly supplied. The subsequent gradual fall in temperature corresponds to cooling of the molten metal. In an additive manufacturing process, since next and subsequent layers A1 are repeatedly formed on an already formed layer A1, each time a new layer A1 is formed, heat generated by the molten metal for forming the new layer A1 will also raise the temperature of a layer A1 under the new layer A1. Therefore, at the lower layer position P, the cycle of temperature rise and fall is repeated many times. However, as the number of laminated layers is increased, influence of heat on the lower layer position P is decreased, and thus, a range and a rate of change in temperature rise and fall are decreased as the number of cycles is increased.

In the additive manufacturing process, since a process of forming a next layer by laminating the next layer on an already formed layer is repeated, a cooling rate of a heated metal material is slowed compared with a process such as arc welding in which a metal material is melted and solidified without being laminated in multiple layers. In a duplex SUS, according to a continuous cooling transformation curve (CCT curve), when a molten or heated metal material is cooled, the slower the cooling rate, the more likely the austenite phase is generated. Therefore, when additive manufacturing is performed by using a metal wire by which a duplex SUS can be obtained, a large amount of austenite phases tend to be easily generated in the obtained additively-manufactured object.

However, the metal wire according to the present embodiment has the above component composition, so that an additively-manufactured object having a well-balanced phase ratio between an austenite phase and a ferrite phase can be obtained. Here, the slowest cooling rate in a temperature range from 1,200° C. to 800° C. is considered in the graph of temperature change during the additive manufacturing as shown in FIG. 3. That is, as indicated by a dotted line in FIG. 3, the temperature change is linearly approximated in a process of cooling in the temperature range from 1,200° C. to 800° C., and the cooling rate is obtained as a slope of the straight line. Then, the slowest value of the cooling rate is considered. Here, a reason why only the temperature range of 800° C. or higher is considered is that in a range of lower than 800° C., a diffusion coefficient is small and influence of phase transformation kinetics is small. In addition, a reason why the slowest value of the cooling rate is considered is that, as described above, excessive austenite tends to be generated when the cooling rate is slow.

The metal wire according to the present embodiment has the above component composition, so that in an additively-manufactured object formed in a condition that the slowest cooling rate in the temperature range between 1,200° C. and 800° C. is 10° C./s or more and 140° C./s or less, the ferrite content (a volume ratio of the ferrite phase in the entire structure) tends to fall within a range of 30% or more and 70% or less. Furthermore, the ferrite content tends to fall within a range of 40% or more and 60% or less. It is preferable that the ferrite content in the above range is achieved at any slowest cooling rate in the range of 10° C./s or more and 140° C./s or less, and it is more preferable that the ferrite content is 30% or more and 70% or less, further preferably 40% or more and 60% or less, in the entire range of the slowest cooling rate of 10° C./s or more and 140° C./s or less.

Here, the range of the slowest cooling rate that defines the ferrite content in the additively-manufactured object obtained from the metal wire is set to 10° C./s or more and 140° C./s or less, but the cooling rate in the range is typical as a cooling rate in the case of actually performing additive manufacturing, and is a cooling rate at which an additively-manufactured object having excellent pitting corrosion resistance and hardness can be suitably manufactured as described later regarding the additive manufacturing method. In the additive manufacturing process, the cooling rate may be changed depending on a shape of the additively-manufactured object to be manufactured and a specific condition during additive manufacturing, but in the case where the slowest cooling rate is within the above range, an additively-manufactured object having a ferrite content within an intermediate range of 30% or more and 70% or less can be obtained. Therefore, even in the case where there are some fluctuations in thermal history such as the cooling rate in the additive manufacturing process, in the structure of the additively-manufactured object, a state in which the ferrite phase is extremely abundant or a state in which the austenite phase is extremely abundant is unlikely to occur, and the structure of the additively-manufactured object can be stably controlled. As a result, it is possible to stably obtain an additively-manufactured object containing the ferrite phase and the austenite phase in a well-balanced manner.

Furthermore, in the metal wire according to the present embodiment, it is preferable that a pitting resistance equivalent number (PREN) and a critical pitting temperature (CPT) satisfy a relationship of CPT/PREN≥0.7. Here, the pitting resistance equivalent number (PREN) is calculated by the following equation (4) based on the component composition of the metal wire.

$$PREN=Cr+3.3(Mo+0.5W)+16N \tag{4}$$

In addition, the critical pitting temperature (CPT) is a value (unit: ° C.) actually measured as a critical pitting temperature of the additively-manufactured object formed in a condition that the slowest cooling rate in the temperature range between 1,200° C. and 800° C. is 10° C./s or more and 140° C./s or less. The critical pitting temperature can be evaluated, for example, by ASTM G48 C method.

The pitting resistance equivalent number predicts pitting corrosion resistance based on a component composition of SUS. The ratio CPT/PREN between the pitting resistance equivalent number and the critical pitting temperature serves as an index for determining whether an alloy structure is appropriate from the viewpoint of achieving high corrosion resistance, and a large value of the ratio indicates that the metal structure of the actually obtained SUS has a structure capable of sufficiently achieving the pitting corrosion resistance given by the component composition. That is, CPT/PREN≥0.7 in the additively-manufactured object indicates that influence of the thermal history during additive manufacturing, such as the cooling rate, on the metal structure is restrained to be low, and that a high pitting corrosion resistance due to the effect of the component composition is achieved in the actual metal structure. It is preferable that CPT/PREN≥0.7 is achieved at any slowest cooling rate in the range of 10° C./s or more and 140° C./s or less, and more preferably, CPT/PREN≥0.7 is satisfied in the entire range of the slowest cooling rate of 10° C./s or more and 140° C./s or less. More preferably, CPT/PREN≥0.8.

[Additively-Manufactured Object]

Next, an additively-manufactured object according to an embodiment of the present invention will be described. The additively-manufactured object according to an embodiment of the present invention is manufactured by performing additive manufacturing by using the additive manufacturing wire according to an embodiment of the present disclosure described above. As illustrated in FIG. 2, in the additive manufacturing, layers each formed by melting and solidifying the additive manufacturing wire are three-dimensionally laminated to form an additively-manufactured object having a desired shape.

A component composition of the additively-manufactured object does not substantially change from the component composition of the additive manufacturing wire described above. The additively-manufactured object has such a component composition, so that the additively-manufactured object is made of a duplex SUS containing an austenite phase and a ferrite phase in a well-balanced manner. Accordingly, the additively-manufactured object is excellent in both pitting corrosion resistance and mechanical strength such as hardness.

Preferably, the additively-manufactured object has a ferrite content in a range of 30% or more and 70% or less. More preferably, the ferrite content is in a range of 40% or more and 60% or less. An additively-manufactured object having a ferrite content within these ranges can be easily obtained by performing additive manufacturing under a condition that the slowest cooling rate in the temperature range between 1,200° C. and 800° C. is 10° C./s or more and 140° C./s or less and by using the additive manufacturing wire described above. Furthermore, the additively-manufactured object manufactured at the slowest cooling rate in that range tends to satisfy the relationship of CPT/PREN≥0.7, and have a suitable structure that exhibits high pitting corrosion resistance given by the component composition.

It is preferable that the additively-manufactured object is entirely made of the ferrite phase and the austenite phase, except for other phases that are inevitably generated. That is, it is preferable that the ferrite phase occupies 30% or more and 70% or less, or more preferably 40% or more and 60% or less in the entire structure, and that the austenite phase occupies the reminder. in the case where the phase ratio of the ferrite phase and the austenite phase is 1:1, the additively-manufactured object has the best balance between the strength and the pitting corrosion resistance. It is preferable that an additively-manufactured object having a phase ratio of 1:1 within an allowable error range (for example, a range of ±15% in terms of the ferrite content and the austenite content) is obtained by appropriately performing the heat treatment described in the subsequent description of the additive manufacturing method.

[Additive Manufacturing Method]

Next, an additive manufacturing method according to an embodiment of the present invention will be described. In the additive manufacturing method according to an embodiment of the present invention, additive manufacturing is performed by using the additive manufacturing wire according to an embodiment of the present disclosure described above. When the additive manufacturing is performed, as illustrated in FIG. 2, the layer A1 is formed by holding the additive manufacturing wire 1 by the torch 2 or the like, the heating additive manufacturing wire 1 by generating an arc or emitting a laser beam, and melting and solidifying the additive manufacturing wire 1. The additively-manufactured object A having a desired three-dimensional shape is manufactured by repeatedly forming and laminating the layers A1.

In the additive manufacturing method according to the present embodiment, it is preferable that the additive manufacturing is performed in a condition that the slowest cooling rate in the temperature range between 1,200° C. and 800° C. is 10° C./s or more and 140° C./s or less. By setting the slowest cooling rate to 10° C./s or more, a sufficient amount of ferrite phases are easily generated, and precipitation of a σ phase during a cooling process can be prevented, making it easier to maintain high pitting corrosion resistance of the additively-manufactured object to be manufactured. From the viewpoint of improving the effect, it is preferable that the slowest cooling rate is set to 15° C./s or more, and further preferably 20° C./s or more. On the other hand, the ferrite content is not decreased when the cooling rate exceeds a certain value, but by defining the slowest cooling rate as 140° C./s or less, a sufficient amount of ferrite phases can be easily secured in the additively-manufactured object. From the viewpoint of improving the effect, it is preferable that the slowest cooling rate is set to 130° C./s or less, and further preferably 120° C./s or less. The cooling rate during the additive manufacturing can be adjusted by conditions during the additive manufacturing, such as a type and a diameter of the additive manufacturing wire to be used, the amount of heat to be applied when the additive manufacturing wire is heated, and a moving speed of the additive manufacturing wire.

After the additively-manufactured object having a desired shape is manufactured by the additive manufacturing using the additive manufacturing wire, a heat treatment may be performed on the manufactured additively-manufactured object. The phase ratio between the ferrite phase and the austenite phase in the additively-manufactured object can be adjusted by the heat treatment. The additive manufacturing wire has the above predetermined component composition, so that when the additive manufacturing process is carried out, it is easier to obtain an additively-manufactured object containing a ferrite phase and an austenite phase in a well-balanced manner compared with a case of performing additive manufacturing by using a wire made of general duplex SUS. However, in the additive manufacturing process, a next layer is laminated on a formed layer, so that an environment is such that the austenite phase is more likely to be generated than in a general welding process. Therefore, by performing the heat treatment on the manufactured additively-manufactured object, a ratio of the ferrite phase can be increased, and the phase ratio can be adjusted to a desired phase ratio in which the ratio of the ferrite phase is sufficiently high.

In the present embodiment, the additive manufacturing wire has the above component composition, so that a phase transition between the austenite phase and the ferrite phase proceeds even at a low temperature in the manufactured additively-manufactured object. Therefore, the phase ratio can be adjusted by a heat treatment at a relatively low temperature. Specifically, it is preferable that the heat treatment is performed at a temperature of 800° C. or higher and 1,200° C. or lower. Preferably, in order to obtain a phase ratio of the austenite phase and the ferrite phase being 1:1 or a phase ratio close thereto, the heat treatment temperature may be selected within the range of 800° C. or higher and 1,200° C. or lower depending on a specific composition and the like of the additively-manufactured object. In a duplex SUS in the related art, a heat treatment at a high temperature of 1,350° C. or higher is often required to adjust a phase ratio, but in the present embodiment, adjustment of a phase ratio can be achieved by a heat treatment at a lower temperature of 1,200° C. or lower. By restraining the heat treatment temperature to a low level, it is possible to reduce deformation (heat treatment distortion) of the additively-manufactured object due to thermal stress generated during cooling after the heat treatment. In addition, the heat treatment can be easily performed industrially. It is preferable that the heat treatment is performed in the above temperature range of 800° C. or higher and 1,200° C. or lower for, for example, 1 minute or longer and 10 hours or shorter. In addition, the heat treatment may be performed in an environment such as an air atmosphere, a nitrogen atmosphere, and an argon atmosphere.

EXAMPLES

Hereinafter, the present invention will be described in more detail with reference to Examples.

[1] Relationship between Component Composition of Metal Wire and State of Additively-Manufactured Object First, the phase ratio and the pitting corrosion resistance were evaluated in the additively-manufactured object obtained by performing additive manufacturing by changing the component composition of the metal wire and further changing the cooling rate during the additive manufacturing.

[Preparation of Sample]

Metal wires were manufactured containing component elements A to M shown in Table 1 below with a balance being Fe and unavoidable impurities. In manufacturing the metal wire, raw materials of each component element were melted, cast, and processed into a rod shape by hot forging, hot extrusion, and cold working. Further, by performing wire drawing, annealing, and pickling, a metal wire (solid wire) for additive manufacturing was obtained. Furthermore, a Cu coating layer was formed on a surface of the metal wire having a component composition of D, and a Cu-coated wire having a component composition of D' as a whole was produced. At this time, in the above manufacturing process, the rod-shaped alloy material was annealed and pickled, and then after a Cu coating layer was formed thereon by Cu plating, the rod-shaped alloy material was drawn to prepare the Cu-coated wire.

[Test Methods]

<Evaluation of Metal Structure>

Additive manufacturing was performed by using the metal wire produced above. At this time, the slowest cooling rate at the temperature between 1,200° C. and 800° C. during the additive manufacturing was changed up to 150° C./s, 100° C./s, 50° C./s, 15° C./s, and 10° C./s. The slowest cooling rate was controlled by forced cooling by water cooling, heat input control, and inter-pass control. Then, the amounts of the ferrite phase and the austenite phase generated (a volume ratio of each phase in the entire structure)

calculated. The case where CPT/PREN≥0.7 was determined that an appropriate structure by which high pitting corrosion resistance is achieved can be obtained (OK). On the other hand, the case where CPT/PREN<0.7 was determined that an appropriate structure by which high pitting corrosion resistance is achieved cannot be obtained (NG). The evaluation of the pitting corrosion resistance was also performed in a state in which the additively-manufactured object was not subjected to a heat treatment.

[Test Results]

Table 1 below shows the component composition of the alloys A to M forming the metal wire and the overall composition D' of the Cu-coated wire (unit: % by mass). Table 1 also shows the Cr equivalent ($Cr_{eq}$), the Ni equivalent ($Ni_{eq}$), the A value, and the pitting resistance equivalent number (PREN) calculated by the above equations (1) to (4) based on the component composition.

TABLE 1

| Alloy species | Component composition (% by mass) | | | | | | | | | | | | | A | | |
| | C | Si | Mn | Cu | Cr | Ni | Mo | W | Nb | Ti | Al | N | Co | $Cr_{eq}$ | $Ni_{eq}$ | value | PREN |
|---|---|---|---|---|---|---|---|---|---|---|---|---|---|---|---|---|---|
| A | 0.02 | 0.40 | 1.5 | 0.3 | 22.4 | 5.95 | 3.3 | — | — | — | — | 0.16 | — | 26.3 | 10.65 | 50.4 | 36 |
| B | 0.10 | 2.0 | 6.0 | 0.3 | 22.0 | 4.0 | 2.0 | — | — | — | — | 0.10 | — | 27.0 | 12.15 | 40.9 | 30 |
| C | 0.01 | 0.50 | 0.60 | 0.5 | 25.0 | 7.5 | 3.0 | — | | — | — | 0.20 | — | 28.8 | 12.35 | 50.1 | 38 |
| D | 0.02 | 0.50 | 0.60 | 0.03 | 25.0 | 9.5 | 3.9 | — | — | — | — | 0.23 | — | 29.7 | 15.02 | 31.0 | 42 |
| D' | 0.02 | 0.50 | 0.60 | 0.5 | 25.0 | 9.5 | 3.9 | — | — | — | — | 0.23 | — | 29.7 | 15.25 | 28.8 | 42 |
| E | 0.02 | 0.50 | 1.5 | 0.03 | 23.0 | 8.6 | 3.3 | — | — | — | — | 0.15 | — | 27.1 | 12.97 | 33.6 | 36 |
| F | 0.03 | 1.0 | 1.0 | 1.0 | 26.0 | 8.0 | 5.0 | 5.0 | — | — | — | 0.32 | — | 35.0 | 16.30 | 52.7 | 56 |
| G | 0.02 | 0.50 | 0.60 | 0.03 | 30.0 | 15.0 | 2.0 | — | — | — | — | 0.05 | — | 32.8 | 16.92 | 32.8 | 37 |
| H | 0.02 | 0.50 | 0.60 | 0.03 | 20.0 | 5.0 | 2.0 | — | — | — | — | 0.05 | — | 22.8 | 6.92 | 62.8 | 27 |
| I | 0.02 | 0.50 | 0.60 | 0.03 | 20.0 | 5.0 | 2.0 | — | — | 0.50 | 0.20 | 0.05 | 5.0 | 24.2 | 9.42 | 48.4 | 27 |
| J | 0.01 | 0.50 | 0.60 | | 25.0 | 7.5 | 3.0 | — | — | — | — | 0.2 | — | 28.8 | 12.10 | 52.4 | 38 |
| K | 0.01 | 0.50 | 0.60 | | 25.0 | 7.5 | 3.0 | — | 4.0 | — | — | 0.2 | — | 30.8 | 12.10 | 65.0 | 38 |
| L | 0.09 | 3.0 | 7.0 | 0.06 | 20.0 | 5.0 | 2.0 | 7.0 | — | 0.60 | — | 0.50 | — | 31.2 | 21.23 | −17.1 | 46 |
| M | 0.02 | 0.50 | 0.60 | 0.03 | 19.0 | 2.0 | 2.0 | — | — | — | — | 0.05 | — | 21.8 | 3.92 | 84.4 | 26 | were evaluated by optical microscopic observation and X-ray diffraction (XRD) measurement of a cross section of the obtained additively-manufactured object. The evaluation of the metal structure was performed in a state in which the additively-manufactured object was not subjected to a heat treatment.

<Evaluation of Pitting Corrosion Resistance>

Figure 4:
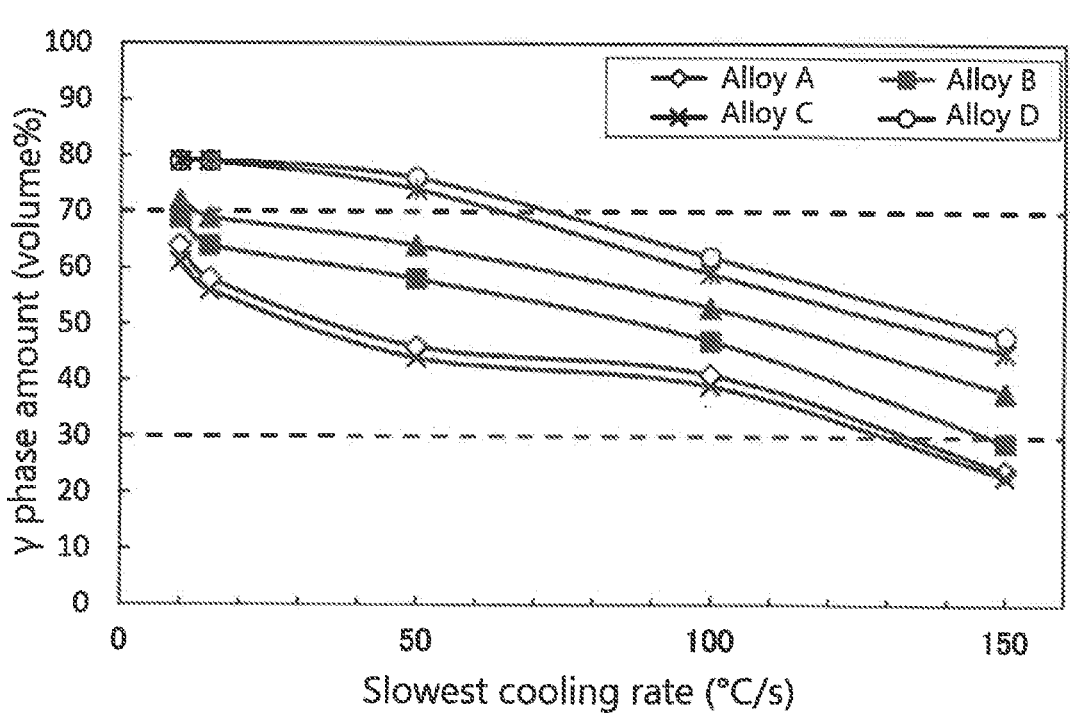
FIG. 4 is a diagram showing a relationship between a slowest cooling rate and an austenite content when the additive manufacturing is performed by using additive manufacturing wires made of a plurality of alloy species.

A test according to the ASTM G48 C method was performed on each additively-manufactured object produced above, and the critical pitting temperature (CPT) was evaluated. Then, a ratio between the obtained critical pitting temperature (CPT) and the pitting resistance equivalent number (PREN) calculated by the above equation (4) based on the component composition of the metal wire was Tables 2 and 3 show evaluation results for samples produced by additive manufacturing under conditions with different slowest cooling rates in a temperature range of 800° C. or higher and 1,200° C. or lower by using the metal wire made of the above alloys A to M and the Cu-coated wire having the composition of D' as a whole. As the evaluation results, the amount of the ferrite phase (a phase) and the austenite phase (γ phase) generated obtained by the evaluation of the metal structure, and determination results of the CPT/PREN value obtained by the evaluation of the pitting corrosion resistance are shown. Furthermore, FIG. 4 is a graph showing a relationship between the slowest cooling rate and the amount of the γ phase generated in the case where the alloys A to F are used.

TABLE 2

| Alloy species | Sample number | Slowest cooling rate (° C./s) | $Cr_{eq}$ | $Ni_{eq}$ | A value | PREN | α phase content (% by volume) | γ phase content (% by volume) | CPT/PREN value |
|---|---|---|---|---|---|---|---|---|---|
| A | A1 | 150 | 26.3 | 10.65 | 50.4 | 36 | 76 | 24 | NG |
| | A2 | 100 | | | | | 59 | 41 | OK |
| | A3 | 50 | | | | | 54 | 46 | OK |
| | A4 | 15 | | | | | 42 | 58 | OK |
| | A5 | 10 | | | | | 36 | 64 | NG |
| B | B1 | 150 | 27.0 | 12.15 | 40.9 | 30 | 71 | 29 | NG |
| | B2 | 100 | | | | | 53 | 47 | OK |
| | B3 | 50 | | | | | 42 | 58 | OK |
| | B4 | 15 | | | | | 36 | 64 | OK |
| | B5 | 10 | | | | | 31 | 69 | NG |

TABLE 2-continued

| Alloy species | Sample number | Slowest cooling rate (° C./s) | $Cr_{eq}$ | $Ni_{eq}$ | A value | PREN | α phase content (% by volume) | γ phase content (% by volume) | CPT/PREN value |
|---|---|---|---|---|---|---|---|---|---|
| C | C1 | 150 | 28.8 | 12.35 | 50.1 | 38 | 77 | 23 | NG |
|   | C2 | 100 |   |   |   |   | 61 | 39 | OK |
|   | C3 | 50 |   |   |   |   | 56 | 44 | OK |
|   | C4 | 15 |   |   |   |   | 44 | 56 | OK |
|   | C5 | 10 |   |   |   |   | 39 | 61 | NG |
| D | D1 | 150 | 29.7 | 15.02 | 31.0 | 42 | 52 | 48 | OK |
|   | D2 | 100 |   |   |   |   | 38 | 62 | OK |
|   | D3 | 50 |   |   |   |   | 24 | 76 | NG |
|   | D4 | 15 |   |   |   |   | 21 | 79 | NG |
|   | D5 | 10 |   |   |   |   | 21 | 79 | NG |
| D' | D'1 | 100 | 29.7 | 15.25 | 28.8 | 42 | 35 | 65 | OK |
| E | E1 | 150 | 27.1 | 12.97 | 33.6 | 36 | 55 | 45 | OK |
|   | E2 | 100 |   |   |   |   | 41 | 59 | OK |
|   | E3 | 50 |   |   |   |   | 26 | 74 | NG |
|   | E4 | 15 |   |   |   |   | 21 | 79 | NG |
|   | E5 | 10 |   |   |   |   | 21 | 79 | NG |

20

TABLE 3

| Alloy species | Sample number | Slowest cooling rate (° C./s) | $Cr_{eq}$ | $Ni_{eq}$ | A value | PREN | α phase content (% by volume) | γ phase content (% by volume) | CPT/PREN value |
|---|---|---|---|---|---|---|---|---|---|
| F | F1 | 150 | 35.0 | 16.30 | 52.7 | 56 | 62 | 38 | NG |
|   | F2 | 100 |   |   |   |   | 47 | 53 | OK |
|   | F3 | 50 |   |   |   |   | 36 | 64 | OK |
|   | F4 | 15 |   |   |   |   | 31 | 69 | OK |
|   | F5 | 10 |   |   |   |   | 28 | 72 | NG |
| G | G1 | 150 | 32.8 | 16.92 | 32.8 | 37 | 72 | 28 | NG |
|   | G2 | 100 |   |   |   |   | 50 | 50 | OK |
|   | G3 | 50 |   |   |   |   | 45 | 55 | OK |
|   | G4 | 15 |   |   |   |   | 38 | 62 | OK |
|   | G5 | 10 |   |   |   |   | 28 | 72 | NG |
| H | H1 | 150 | 22.8 | 6.92 | 62.8 | 27 | 48 | 52 | OK |
|   | H2 | 100 |   |   |   |   | 37 | 63 | OK |
|   | H3 | 50 |   |   |   |   | 37 | 63 | OK |
|   | H4 | 15 |   |   |   |   | 21 | 79 | NG |
|   | H5 | 10 |   |   |   |   | 20 | 80 | NG |
| I | I1 | 15 | 24.2 | 9.42 | 48.4 | 27 | 37 | 63 | OK |
| J | J1 | 150 | 28.8 | 12.10 | 52.4 | 38 | 77 | 23 | NG |
|   | J2 | 100 |   |   |   |   | 61 | 39 | OK |
|   | J3 | 50 |   |   |   |   | 56 | 44 | OK |
|   | J4 | 15 |   |   |   |   | 44 | 56 | OK |
|   | J5 | 10 |   |   |   |   | 39 | 61 | OK |
| K | K1 | 150 | 30.8 | 12.10 | 65.0 | 38 | 48 | 52 | OK |
|   | K2 | 100 |   |   |   |   | 37 | 63 | OK |
|   | K3 | 50 |   |   |   |   | 37 | 63 | OK |
|   | K4 | 15 |   |   |   |   | 21 | 79 | NG |
|   | K5 | 10 |   |   |   |   | 20 | 80 | NG |
| L | L1 | 100 | 31.2 | 21.23 | −17.1 | 46 | 20 | 80 | NG |
| M | M1 | 100 | 21.8 | 3.92 | 84.4 | 26 | 80 | 20 | NG |

As shown in Table 1, the alloys L and M each did not have the predetermined component composition according to the embodiment of the present invention described above, and each A value thereof did not satisfy the range of 27<A<67. According to Table 3, in samples L1 and M1 respectively using the alloys L and M, the balance of the phase ratio between the α phase and the γ phase was deteriorated. Specifically, in the sample L1 using the alloy L having an A value of 27 or less, the ratio of they phase was large, with the α phase being 20% and they phase being 80%. On the other hand, in the sample M1 using the alloy M having an A value of 67 or more, the ratio of the α phase was large, with the α phase being 80% and the γ phase being 20%. Determination results of the CPT/PREN value thereof were both "NG", and structures suitable for achieving high pitting corrosion resistance were not obtained.

In contrast, the alloys A to K and the composition D' each had the predetermined component composition according to the embodiment of the present invention described above, and each A value thereof also satisfied the range of 27<A<67. According to Tables 2 and 3, it can be said that in the case where these alloys A to K and the composition D' were applied, in either case, at the slowest cooling rate at least in a part in the range of 10° C./s to 140° C./s, all of the amounts of the α phase and the γ phase generated were in a range of 30% to 70%, and the α phase and the γ phase were generated in a well-balanced phase ratio. In addition, at the slowest cooling rate at least in a part in the range, determination results of the CPT/PREN value thereof were "OK", and structures suitable for achieving high pitting corrosion resistance were obtained. From these results, it can be seen that by forming an additive manufacturing wire by an alloy that has the predetermined component composition according to the embodiment of the present invention described above and has an A value that satisfies 27<A<67, it is possible to manufacture an additively-manufactured object having a structure in which the α phase and the γ phase are generated in a well-balanced manner and by which high pitting corrosion resistance is achieved.

Referring to FIG. 4, it can be seen that for each case of the alloys A to F, the faster the slowest cooling rate, the less the amount of the γ phase generated. Accordingly, the amount of the α phase generated was increased. Regardless of which alloy is used, at least part of the range in which the slowest cooling rate was 10° C./s to 140° C./s was within a region indicated by dashed lines in which the amount of the γ phase generated was 30% to 70%. That is, it can be seen that in the case where additive manufacturing is performed by using a wire made of these alloys, by appropriately selecting the slowest cooling rate in the range of 10° C./s to 140° C./s, it is possible to obtain α phase ratio in which they phase content is 30% to 70%. In particular, for alloy B, the amount of the γ phase generated was within the range of 30% to 70% or less in the entire range of the slowest cooling rate of 10° C./s to 140° C./s.

[2] Adjustment of Phase Ratio by Heat Treatment

Next, an effect of adjusting the phase ratio by the heat treatment was confirmed by using representative samples.

[Test Methods]

The heat treatment was separately performed on the additively-manufactured objects obtained as the sample C3 and sample D3 in the above test [1]. Then, a cross section of each sample after the heat treatment was observed and each generation ratio of the γ phase was evaluated. The heat treatment temperature was changed in increments of 50° C. within a range of 950° C. to 1,300° C. The heat treatment was performed in an air atmosphere, and a heat treatment time was 60 minutes or longer.

[Test Results]

Figure 5:
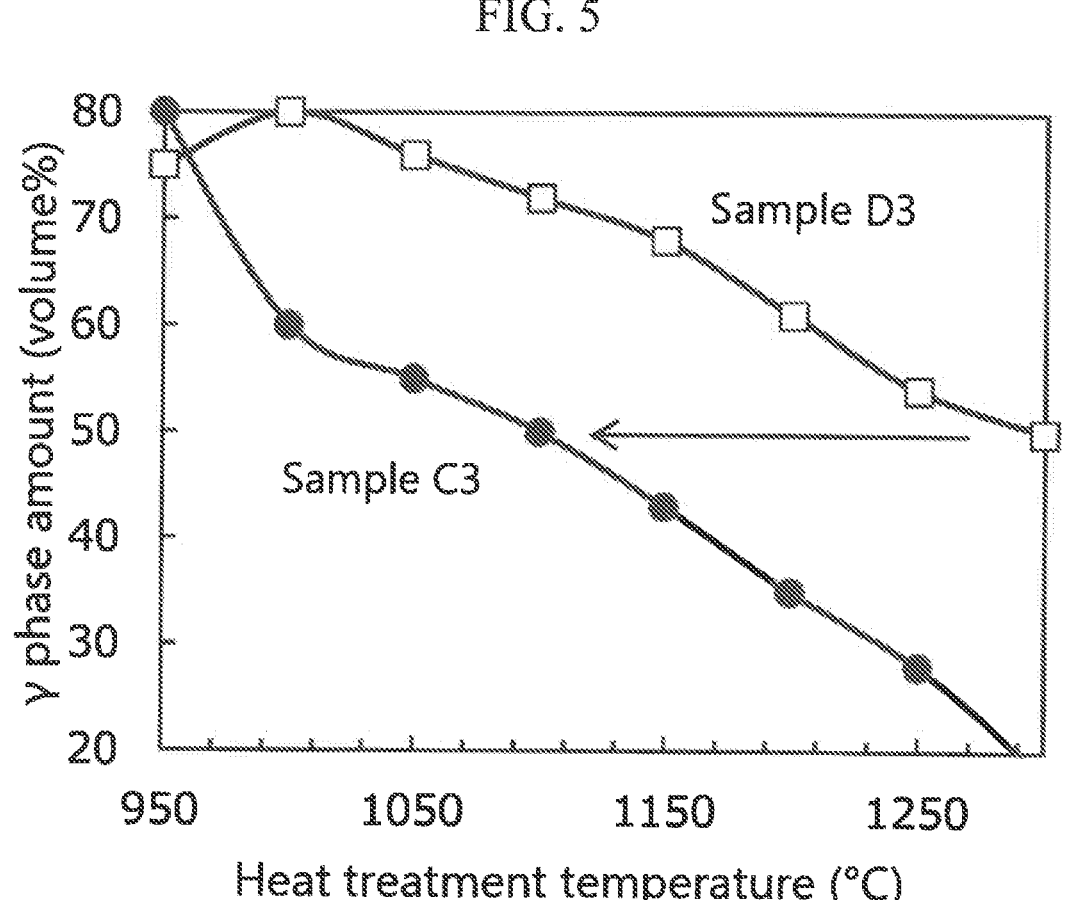
FIG. 5 is a diagram showing a relationship between a heat treatment temperature and the austenite content for each of two samples.

FIG. 5 shows a relationship between the heat treatment temperature and the amount of the γ phase generated for each of the sample C3 and the sample D3. According to FIG. 5, in both the sample C3 and the sample D3, in general, the higher the temperature of the heat treatment, the less the amount of the γ phase generated. That is, by performing the heat treatment at a high temperature, it is possible to increase the ratio of the α phase and improve the pitting corrosion resistance of the additively-manufactured object. In addition, in both the sample C3 and the sample D3, the ratio of the γ phase was greatly changed in a region in which the heat treatment temperature was 1,200° C. or lower. Thus, it can be seen that even in the case where the heat treatment is performed at a relatively low temperature of 1,200° C. or less, the phase ratio can be adjusted in a wide range.

When behaviors of the sample C3 and the sample D3 are compared with each other, in the sample C3, the amount of the γ phase generated was restrained to a smaller value than in the sample D3 in the substantially entire range of the heat treatment temperature. For example, the heat treatment temperature at which a 50% γ phase content corresponding to the phase ratio of 1:1 was obtained was, about 1,250° C. in the sample D3, whereas about 1,100° C. in the sample C3, as indicated by an arrow in the figure. Both the sample C3 and the sample D3 had the slowest cooling rate of 50° C./s during the additive manufacturing, but the component compositions of the wires were different from each other, and the A value in the sample C3 (A=50.1) was larger than that in the sample D3 (A=31.0). Thus, it can be said that by increasing the A value, the ratio of the γ phase can be effectively increased even in the case where the heat treatment temperature is not raised to a high temperature. An adjustment range of the phase ratio by selecting the heat treatment temperature in the sample C3 was also larger than that in the sample D3.

The embodiments and examples of the present invention have been described above. The present invention is not particularly limited to these embodiments and examples, and various modifications can be made.

The present application is based on Japanese Patent Application No. 2022-002134 filed on Jan. 11, 2022 and Japanese Patent Application No. 2022-168584 filed on Oct. 20, 2022, the contents thereof being hereby incorporated by reference.

DESCRIPTION OF REFERENCE NUMERALS AND SIGNS

1 Metal wire (additive manufacturing wire)
2 Torch
A Additively-manufactured object
A1 Layer
P Lower layer position
S Base material

The invention claimed is:

1. An additive manufacturing wire,
consisting of, in terms of % by mass,
   0%<Si≤2.0%,
   0%<Mn≤6.0%,
   3.0%≤Ni≤15.0%,
   20.0%≤Cr≤30.0%,
   1.0%≤Mo≤5.0%, and
   0%<N≤0.50%, and
   at least one selected from the group consisting of:
      0.01%≤Cu≤6.0%,
      0%<Co≤5.0%,
      0%<Al≤0.30%,
      0%<Ti≤0.50%,
      0%<Nb≤4.0%, and
      0%<Mg≤0.0050%,
   with a balance being Fe and unavoidable impurities,
wherein
C≤0.10% is satisfied,
50.1<A<67 is satisfied,
   when $Cr_{eq}$ is defined as Cr+Mo+1.5Si+0.5(Nb+W)+2(Ti+Al),
   $Ni_{eq}$ is defined as Ni+30C+20N+0.5(Mn+Cu+Co), and
   A is defined as $-16.2+6.3Cr_{eq}-9.3Ni_{eq}$,
   here, in the definition of $Cr_{eq}$ and $Ni_{eq}$, each element symbol indicates a content of the each element in units of % by mass, and
wherein the additive manufacturing wire is a solid wire or a metal-cored wire.

2. The additive manufacturing wire according to claim 1, further satisfying, in terms of % by mass,
   at least one selected from the group consisting of:
      0.03%≤Cu≤6.0%,
      0.3%≤Co≤5.0%,
      0.02%<Al≤0.30%,
      0.02%<Ti≤0.50%,
      0.10%<Nb≤4.0%, and
      0.0010%≤Mg≤0.0050%.

3. The additive manufacturing wire according to claim 1, wherein when an additively-manufactured object is manufactured in a condition that a slowest cooling rate in a temperature range between 1,200° C. and 800° C. is 10° C./s or more and 140° C./s or less, the additively-manufactured object has a ferrite content of 30% by volume or more and 70% by volume or less.

4. The additive manufacturing wire according to claim 2, wherein when an additively-manufactured object is manufactured in a condition that a slowest cooling rate in a temperature range between 1,200° C. and 800° C. is 10° C./s or more and 140° C./s or less, the additively-manufactured object has a ferrite content of 30% by volume or more and 70% by volume or less.

5. The additive manufacturing wire according to claim 1, satisfying a relationship of CPT/PREN≥0.7, when PREN that is a pitting resistance equivalent number is calculated as PREN=Cr+3.3 (Mo+0.5W)+16N and CPT is defined as a critical pitting temperature of an additively-manufactured object that is manufactured in a condition that a slowest cooling rate in a temperature range between 1,200° C. and 800° C. is 10° C./s or more and 140° C./s or less, here in the definitional equation of PREN, each element symbol indicates a content of the each element in units of % by mass.

6. The additive manufacturing wire according to claim 2, satisfying a relationship of CPT/PREN≥0.7, when PREN that is a pitting resistance equivalent number is calculated as PREN=Cr+3.3 (Mo+0.5W)+16N and CPT is defined as a critical pitting temperature of an additively-manufactured object that is manufactured in a condition that a slowest cooling rate in a temperature range between 1,200° C. and 800° C. is 10° C./s or more and 140° C./s or less, here in the definitional equation of PREN, each element symbol indicates a content of the each element in units of % by mass.

7. The additive manufacturing wire according to claim 1, further comprising a coating layer made of Cu or a Cu alloy on an outer periphery thereof.

8. The additive manufacturing wire according to claim 2, further comprising a coating layer made of Cu or a Cu alloy on an outer periphery thereof.

9. An additive manufacturing wire, comprising, in terms of % by mass,

0%<Si≤2.0%,

0%<Mn≤6.0%, 3.0%≤Ni≤15.0%, 20.0%≤Cr≤30.0%, 1.0%≤Mo≤5.0%, and

0%<N≤0.50%, with a balance being Fe and unavoidable impurities, wherein

C≤0.10% is satisfied, 50.1≤A<67 is satisfied, when $Cr_{eq}$ is defined as Cr+Mo+1.5Si+0.5(Nb+W)+2 (Ti+Al), $Ni_{eq}$ is defined as Ni+30C+20N+0.5(Mn+Cu+Co), and A is defined as $-16.2+6.3Cr_{eq}-9.3Ni_{eq}$, here, in the definition of $Cr_{eq}$ and $Ni_{eq}$, each element symbol indicates a content of the each element in units of % by mass, and wherein the additive manufacturing wire is a solid wire or a metal-cored wire.

* * * * *